United States Patent [19]

Meissner

[11] Patent Number: 5,228,228
[45] Date of Patent: Jul. 20, 1993

[54] BITE DETECTOR FOR FISHING

[76] Inventor: Garry D. Meissner, 116 Kingsway R.D. #1, Mayslanding, N.J. 08330

[21] Appl. No.: 901,624

[22] Filed: Jun. 19, 1992

[51] Int. Cl.⁵ .............................................. A01K 97/12
[52] U.S. Cl. ............................................. 43/17; 43/25
[58] Field of Search ................................... 43/17, 25

[56] References Cited

U.S. PATENT DOCUMENTS

| | | |
|---|---|---|
| 2,302,337 | 11/1942 | Mantell . |
| 2,910,797 | 11/1959 | Cucuro . |
| 2,948,076 | 8/1960 | Patricello . |
| 3,571,536 | 3/1971 | Sparks ................................. 43/17 |
| 3,696,546 | 10/1972 | Ambrose . |
| 3,882,629 | 5/1975 | Kaye . |
| 3,959,910 | 6/1976 | Montgomery . |
| 3,999,323 | 12/1976 | Vitucci ................................. 43/17 |
| 4,276,711 | 7/1981 | Mathauser ........................... 43/17 |
| 4,399,630 | 8/1983 | Lawes . |
| 4,479,321 | 10/1984 | Welstead . |
| 4,506,468 | 3/1985 | Willhite ............................... 43/17 |
| 4,541,195 | 9/1985 | Delaney . |
| 4,568,284 | 6/1986 | Westwood . |
| 4,590,701 | 6/1986 | Rivers . |
| 4,748,760 | 7/1988 | Widmer . |
| 4,766,688 | 8/1988 | Hiles . |
| 4,794,719 | 1/1989 | Rabino . |
| 4,884,355 | 12/1989 | Neihoff et al. ...................... 43/17 |
| 4,930,243 | 6/1990 | Lowe et al. ......................... 43/17 |
| 4,969,285 | 11/1990 | Ellsworth . |
| 5,010,678 | 4/1991 | Peck . |
| 5,125,181 | 6/1992 | Brinton .............................. 43/17 |

Primary Examiner—Kurt C. Rowan
Attorney, Agent, or Firm—Robert F. Zielinski

[57] ABSTRACT

A bite detector for fishing of the type typically used with a fishing rod and reel combination which is placed at or near the tip of a fishing rod, consisting of a lightweight, housing for a circuit having a motion detection means displaced between a power source and an audio or visual signalling means, or both, typically a light and a piezo-electric buzzer. The bite detector of the present invention utilizes a motion detection means which employs a resilient spring or wire which is not orientation dependent. The motion detector means comprises a first electrical contact, preferably a small, helical spring disposed within a cavity or passageway comprising a second electrical contact. When sufficient motion or vibration occurs, such as that as may be encountered when a fish strikes a baited hook, the first electrical contact will come into contact with the second electrical contact which in some embodiments may be the walls of the cavity, thus completing the circuit and triggering the signalling means. Included in the device is a means for adjusting the sensitivity of the trigger circuit. Other preferred embodiments include means for resetting and adjusting signal duration. In other embodiments, the bite detector may be displaced throughout the fishing rod or may be housed in a fish float or "bobber."

16 Claims, 4 Drawing Sheets

BITE DETECTOR FOR FISHING

BACKGROUND OF THE INVENTION

This invention relates generally to fishing apparatuses, and in particular, to bite indicators for indicating to an angler that a fish has taken bait on a fishing line.

Over the years, various audible signalling devices have been provided in association with fishing rods and lines to signal when a fish has struck or taken the baited hook. The attraction of these devices lie in that they essentially allow the angler to fish using a line which may be largely unattended, or to fish using several lines simultaneously and thus, fish with greater efficiency. The most rudimentary and perhaps the oldest of these devices is a simple mechanical signalling apparatus such as a bell or rattle secured to the tip of a fishing rod which is activated by the jerking movement of the rod tip when a fish strikes. Other signalling devices of increasing complexity have also been developed to serve this function. Typically, these devices utilize batteries as a power source and may include an audible alarm or visual alarm, or both, and a structure for closing a switch in a circuit to activate the alarm when an associated fishing pole deviates from a relatively static position, when tension is exerted on the fishing line, or when the fishing line is moved in a linear manner as occurs when a fish strikes the hook or takes the bait.

Generally, the more complex bite detector devices can be characterized as falling into one of two categories. In one category are bite detectors which include some sort of level responsive switch; in another category are those devices which detect movement of the fishing line. For level detecting devices, a switch, often a mercury switch or other similar switch responsive to positional change, is mounted to a fishing pole, and connected in series with the power source and an indicator, e.g., a buzzer or light or both. When fishing this type of bite detector, an angler may support the fishing pole in an available holder or leaned against a leaning aid (such as a forked tree limb, etc.) at approximately a 45 degree angle.

U.S. Pat. No. 3,882,629 to Kaye shows such a general arrangement with a small battery-operated light attached through a mercury switch to a penlight battery. This device is mounted in a cylindrical housing which is fixed by a bracket to the tip of the fishing pole. The bracket includes a means for adjusting the angle of the housing and, thus, the angle at which the mercury switch will close when the pole bends. The pole is supported in a typical pole holder.

U.S. Pat. No. 4,479,321 to Wilstead discloses a similar arrangement with a direct mounting of the cylindrical housing along a pole, and an adjustment which contemplates rotating the housing to change the response angle of the mercury switch. The pole is supported in a forked arm.

U.S. Pat. No. 4,399,630 to Lawes shows a mercury switch controlled at a pole tip, using a remote electrical source such as a trolling motor battery, or a battery pack in the handle of the pole.

U.S. Pat. No. 2,910,797 to Finefeld discloses a mounting tripod for a pole, including a lamp on a counterweighted arm, which is in turn attached to and supports the pole.

U.S. Pat. No. 3,320,268 to Newton discloses a separate light and buzzer spaced apart on a rod, and activated by two metal brackets mounted near the rod tip and acting as electrical contacts. Sensitivity of the device is set by a thumb screw mounted between these brackets.

U.S. Pat. No. 3,696,546 to Ambrose discloses a housing located near the rod handle and having a telescopic contact (resembling a portable radio antenna) extending from the housing upward on the rod. This contact is exposed next to a clamp which is connected in an electrical series circuit. The device actuates the rod when the rod bends and pulls the clamp against the telescopic contact.

Finally, U.S. Pat. No. 2,302,337 to Mantel shows a device having a flashlight configuration, mounted on a rod by metal rods and machine screws. There is a light at the lower end of the device, and a push-type switch protruding from the upper end of the device. A helical spring is positioned to press against the switch when the rod is bent. Sensitivity is adjusted by altering the position of the mounting brackets.

The other category of known prior art devices include those in which movement of the fishing line is directly measured. Such devices typically include a structure for closing a switch in a circuit to actuate an alarm when tension is exerted on the fishing line, or when the fishing line is moved in a linear manner as occurs when a fish strikes the hook or takes the bait.

U.S. Pat. No. 5,010,678 to Peck, et al, discloses a bite detector through which a fishing line is placed and is brought into a desired operational position, resting in a v-notch of a thin wire stylus of a movement sensor in the bite indicator.

U.S. Pat. No. 4,586,284 to Westwood likewise discloses a signalling device which includes a switch arm that frictionally grips the fishing line and which is spring-biased with an adjustment device bearing the sensitivity of the device so that when the fishing line is pulled, an electrical circuit is activated.

U.S. Pat. No. 3,959,910 to Montgomery describes another fishing signal device utilizing a drum switch to complete a circuit and activate an alarm. A fishing line is held frictionally between the crank arms of the drum switch. Movement of the fishing line caused by a biting fish pulls the line from the crank arm and rotates the crank in a direction to activate the drum switch.

The above-listed patents contain some of the features that are common to most all fishing line signalling devices, but are not particularly pertinent to the present invention. It can be appreciated that level sensing switch devices require some sort of angular support mechanism and, therefore, have inherent limitations in the manner in which they may be employed. Moreover, even though some of these devices provide for positional adjustment of the level sensitive switch, they must be constantly re-adjusted during use and as the environment in which they are used changes. For those bite detectors which directly measure line movement, it will likewise be appreciated that these devices are inherently subject to false readings and often employ mechanisms which have a tendency to accumulate small particles of debris typically found in fishing waters such as algae, sand, duck-weed, seaweed and the like, which adhere to the fishing line as the fishing line is spooled-in. Thus, these somewhat more complex line movement devices require periodic cleaning and maintenance and do not lend themselves to fishing environments where this type of debris is abundant. Finally, in view of the limitations found in both level sensitive and line movement devices, it will be appreciated that it is desireable to have a fish bite detector which is not orientation dependent, not inherently subject to false readings and which does not have electro-mechanical components which can become clogged during use.

An object of the present invention is to provide a fishing line signal that alerts a person using the fishing rod by actuating either a buzzer-type audible signal or a light-type visual signal, or both, when a fish strikes the hook or takes the bait and moves the fishing line.

Another object of the invention is to provide a fishing line signal in accordance with the preceding object in which a selector switch is provided to enable the user to select which type of signal is to be actuated or to enable both signals to be actuated.

A further object of the invention is to provide a fishing line signal in according with the preceding objects utilizing a sensitivity adjustment for a switch mechanism which responds to and may be adjusted to compensate for naturally occurring tension forces that might be exerted on the fishing line, thereby reducing the possibility of false signals being rendered.

Still another object of the invention is to provide a fish-bite detector in a waterproof, light-weight housing.

Finally, another object of the invention is to provide a fish-bite detector which may be used during various types of fishing and which would enable an angler to fish with more than one rod at a time.

These, together with other objects and advantages which will become subsequently apparent, reside in the details of construction and operation as more fully hereinafter described in claim, reference being had to the accompanying drawings forming a part hereof, wherein like numerals refer to like parts throughout.

SUMMARY OF THE INVENTION

The present invention is directed to a bite detector for fishing of the type typically used with a fishing rod and reel combination. The bite detector consists of a lightweight housing for an electronic circuit having a motion detection means displaced between a power source and an audio or visual signalling means, or both, typically a light and a piezo-electric buzzer. The motion detector means comprises a first electrical contact, preferably a small, helical spring centrally disposed within a cavity or passageway and which is in proximity to a second electrical contact. When sufficient motion or vibration occurs, such as that as may be encountered when a fish strikes a baited hook, the first electrical contact will come into contact with the second electrical contact, thus completing the circuit and triggering the signalling means. In one embodiment, the bite detector is placed at or near the tip of a fishing rod. In other embodiments, it may be displaced throughout the fishing rod. In still other embodiments, the fish bite detector of the present invention may be housed in a fish float or "bobber."

In the present invention, the first and second signal contacts are configured in such a way that the fish line is in relative proximity to the circuit but does not directly contact the internal elements of the bite detector. Since the fishing line is not in contact with the alarm mechanism or the related contact elements, false alarms due to wet fishing lines and the accumulation of debris within the sensing means are virtually eliminated. Furthermore, because the bite detector of the present invention utilizes a motion detection means which employs a resilient spring, the device is not orientation dependent. Included in the device is a means for adjusting the sensitivity of the motion detection means. Other preferred embodiments include means for resetting and adjusting signal duration. The resulting structure is simple in construction, easy to use and substantially eliminates problems with known, prior art devices. Other features and advantages of the invention will become apparent from the following descriptions of the various embodiments of the invention made with reference to the accompanying drawings.

DETAILED DESCRIPTION OF THE PREFERRED EMBODIMENTS

Figure 1:
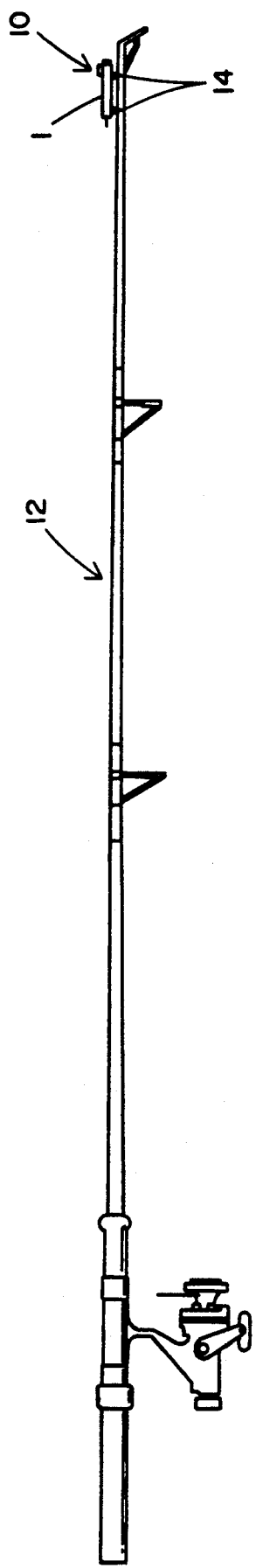
FIG. 1 is a side elevation view of a fishing rod having the fish bite detector of the present invention mounted thereon.

As is shown in FIG. 1, bite detector 1 of the present invention is supported by and contained within housing 10, mounted to a fishing rod 12 via mounting brackets 14. The bite detector is preferably mounted at or near the tip end of the fishing rod. Housing 10 may be cylindrical and may be formed or fabricated from any suitable lightweight, moldable materials such as ABS or nylon. The bite detector housing may also be fabricated so as to be water-resistant or water-proofed to minimize or prevent corrosion of its internal components.

Figure 2:
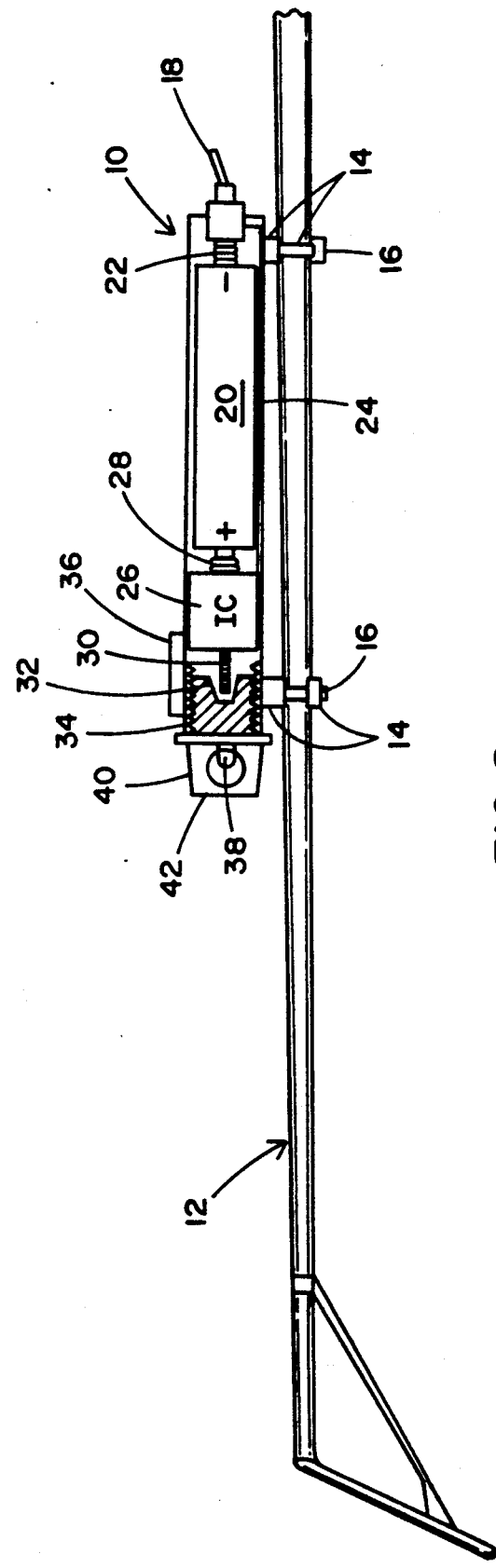
FIG. 2 is a side cross sectional view of the bite detector of the present invention.

FIG. 2. shows the bite detector of the present invention in detailed cross-sectional view. Housing 10 includes mounting bracket 14, having an upper and lower mateable "U" shaped configuration for mounting the bite detector on a fishing rod and which secured the detector in place by mounting bracket fasteners 16. While one preferred embodiment includes a pair of mounting brackets, other mounting bracket configurations such as a single bracket or hinged "U" shaped channel integrally formed with the housing may be used. Positioned at one end of housing 10 is activation switch 18 which activates the bite detector. Switch 18 connected to power source 20 via a first power source contact 22 at one end and a conduit 24 at the other end. Conduit 24 is connected to integrated circuit timer chip 26, which is interdisposed in part between conduit 24 and second power source contact 28. Timer chip is further connected to first electrical contact 30 and second electrical contact 32 which are movable relative to one another via sensitivity adjuster 34. In the embodiment shown, first electrical contact 30 comprises a resilient, helical, wire spring which is displaced longitudinally and centrally within an electrically conductive passage or cavity comprising second electrical contact 32. In alternate preferred embodiments sensitivity adjustment means may take the form of an adjustment screw within a threaded aperture which serves to move either the first or second contact relative to one another. It is preferable, although not essential, that the sensitivity adjustment means of the bite detector of the present invention is configured to be selectively operable to accommodate various fishing conditions an angler may encounter. Therefore, the adjustment means is not limited to forms depicted in the embodiments shown. Connected to timer chip is audible signal means 36 and visual signal means 38. Preferably, audible signal means 36 is a piezo-electric buzzer, although any suitable low power requirement type audible signal generating device may be used. Visual signal means 38 is a low power demand type light bulb, such as a 0.5 watt or less, or preferably it is a light-emitting diode, or LED, which may be enclosed by light cover 40. Light cover 40 is formed from a light transmissible material, typically plastic, and may be clear, opaque or colored. Light cover 40 also provides rotational operation of sensitivity adjuster 34, which causes second electrical contact 32 to move relative to first electrical contact 30. Cover 40 may also include raised longitudinal ridges or bands 42 on its surface to facilitate grasping and operation of sensitivity adjuster 34. It will be appreciated that when the bite detector of the present invention is activated and receives sufficient vibratory motion and/or movement, the first and second signal contact means engage, thus completing an electrical circuit and thereby activating the signal.

Figure 3:
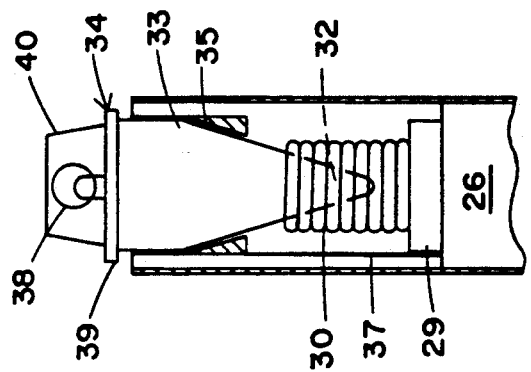
FIG. 3 is a detailed cross sectional view of the motion detection means of the bite detector of the present invention.

FIG. 3 is a close-up cross sectional view of one embodiment of the motion detection means of the present invention. As shown, the motion detection means includes mounting base 29 connected to timer chip 26. Extending from base 29 is first electrical contact 30. First electrical contact 30 is a resilient, helical spring which preferably is of a sufficiently thick gauge wire, tensile strength, or is of sufficient coil density to resist responding to minor vibrational movement. Resilient as used throughout means that the electrical contact is capable of limited movement but that the original shape will be retained even though the contact may move in response to a jerking movement or other similar vibrations typically encountered when fishing. Typically, the spring comprising first electrical contact 30 is approximately 3.5 mm. in height and approximately 1 mm. wide. The cavity defining second electrical contact 34 may be of generally similar scale, although the cavity must be sufficiently greater in dimension to accommodate first electrical contact and so that the electrical contacts are not in contact unless in response to sufficient vibratory movement. Typically, clearance tolerances between the first and second signal contacts are 1.5 mm. or less and are preferably from 0.1 to 0.5 mm. In other embodiments, first electrical contact may simply be a resilient metal wire or metallic band which is similarly anchored to base 29 and which likewise has a limited range of movement in response to vibration and which retains its original shape. Movably located within proximity of the range of movement of first electrical contact 30 is second electrical contact 32. As shown, second electrical contact 32 is integrally formed in a cavity within sensitivity adjuster 34. Adjustment of the proximity of the first and second electrical contacts are achieved by rotation of adjuster 34 along mateable threads 33 and 35 integrally formed on adjuster sidewalls and on the interior surface of housing 10, respectively. When the first and second signal contacts engage, the electronic circuit is completed thereby activating the timing sequence and then visual signal 38 via signal conduit 37. Cover 40 provides protection of the visual signal and when bands 42 are included thereon, facilitate operation of sensitivity adjuster 34.

Figure 4:
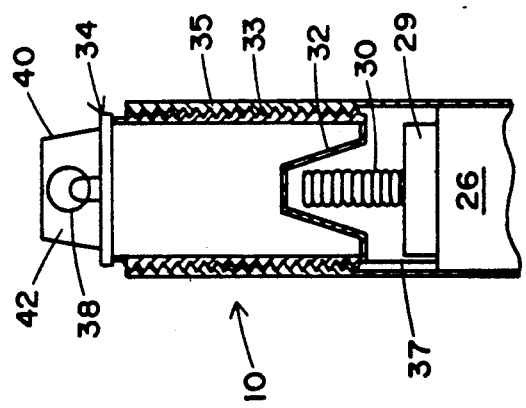
FIG. 4 is a detailed cross sectional view of an alternate form of the motion detection means of the present invention.

FIG. 4 shows an alternate embodiment of the motion detection means of the present invention. First electrical contact 30 comprises a resilient, helical spring supported by mounting base 29. First electrical contact is adapted to generally centrally receive second electrical contact 32 within the interior of first electrical contact 30. Second electrical contact 32 may be cylindrical or rectangular, but as shown in the drawing, may be made tapered or conical so that as second electrical contact 32 is brought into the interior of first electrical contact 30 the sensitivity to vibrational movement increases as the degree of insertion increases. Clearance tolerances between the electrical contacts are generally less than 1.5 mm., preferably 0.5 to 0.1 mm. Sensitivity adjustment is achieved by the upward-downward movement of sensitivity adjuster 34 which forms a compressive fitment within a pathway defined by adjuster sidewalls 33 and housing interior sidewalls 35 either, or both, of which may also be tapered. When the first and second signal contacts engage, the electronic circuit is completed thereby activating timing sequence and then visual signal 38 via signal conduit 37 of that circuit. Cover 40 provides protection of the visual signal and shoulder 39 facilitates operation of sensitivity adjuster 34 by providing a grasping element.

Figure 5:
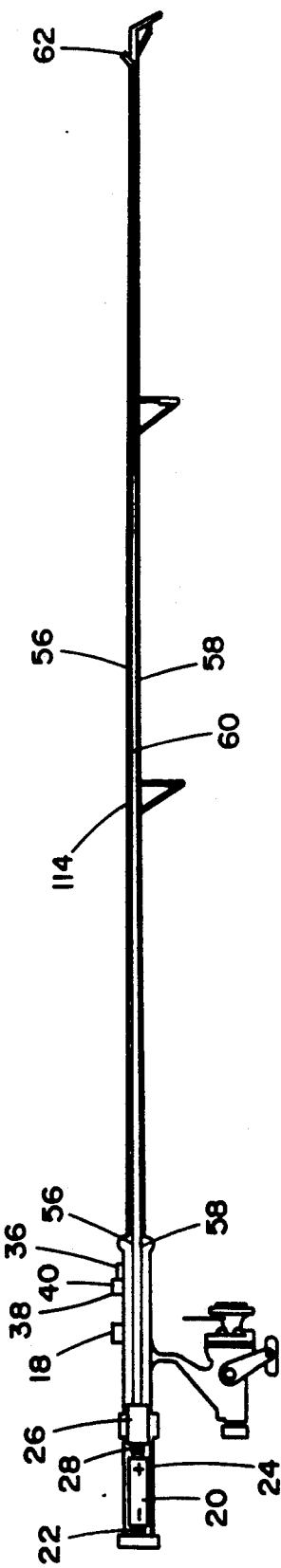
FIG. 5 is a cross sectional view of an alternate embodiment of the bite detector of the present invention disposed within a fishing rod handle.

FIG. 5 shows a cross-sectional view of an alternate embodiment of the bite detector of the present invention disposed throughout the length of a fishing rod. In this embodiment, tip eyelet 62 of fishing rod 114 internally supports the signal contact means and sensitivity adjuster 54 of the present bite detector. First and second signal contacts are connected to the timer chip via first and second signal contact wires 56 and 58 respectively. For multiple piece or sectional fishing rods, optional internal electrical connector 60 for connecting sections of the signal contact wires will be provided. The handle portion of fishing rod 114 houses switch 18 connected to power source 20 via first power source contact 22 at one end and conduit 24 at the other end. Conduit 24 is connected to timer chip 26 which is interdisposed between conduit 24 and second power source contact 28. Connected to timer chip 26 is audible signal means 36 and visual signal means 38. Preferably, audible signal means 36 is a piezo-electric buzzer, although any suitable low power requirement type audible signal generating device may be used. Visual signal means 38 is a low power demand type light bulb, such as a 0.5 watt or less, or preferably it is a light-emitting diode, or LED, which may be enclosed by light cover 40. Light cover 40 is formed from a light transmissible material, typically plastic, and may be clear, opaque or colored. One advantage of embodiment shown in the figure is the ease with which an angler may operate the device by turning it on or off at the handle or gripping portion of the fishing rod.

Figure 6:
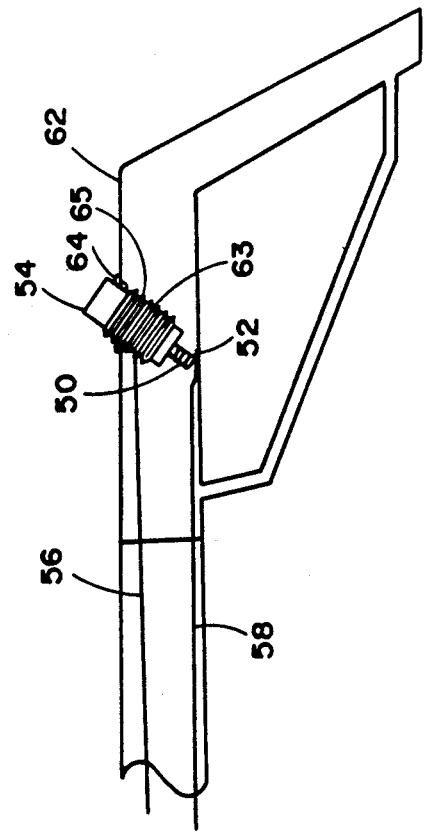
FIG. 6 is a detailed cross sectional view of the motion detection means shown in FIG. 5.

FIG. 6 shows in detail the motion detection assembly disclosed in FIG. 5. Fitted within insulating grommet 64 of tip eyelet 62 of fishing rod 114 is first electrical contact 50 which is movable relative to second electrical contact 52 via remote sensitivity adjuster 54. First signal contact 50 comprises a resilient helical wire spring which is placed in proximity second signal contact 52. In alternate embodiments, where tip eyelet 62 is formed from electrically conductive materials, second electrical contact 52 may simply be an internal wall of the electrically conductive tip eyelet. Connecting the bite detection means to rest of the electronic circuit are remote first and second signal contact wires 56 and 58, respectively.

Figure 7:
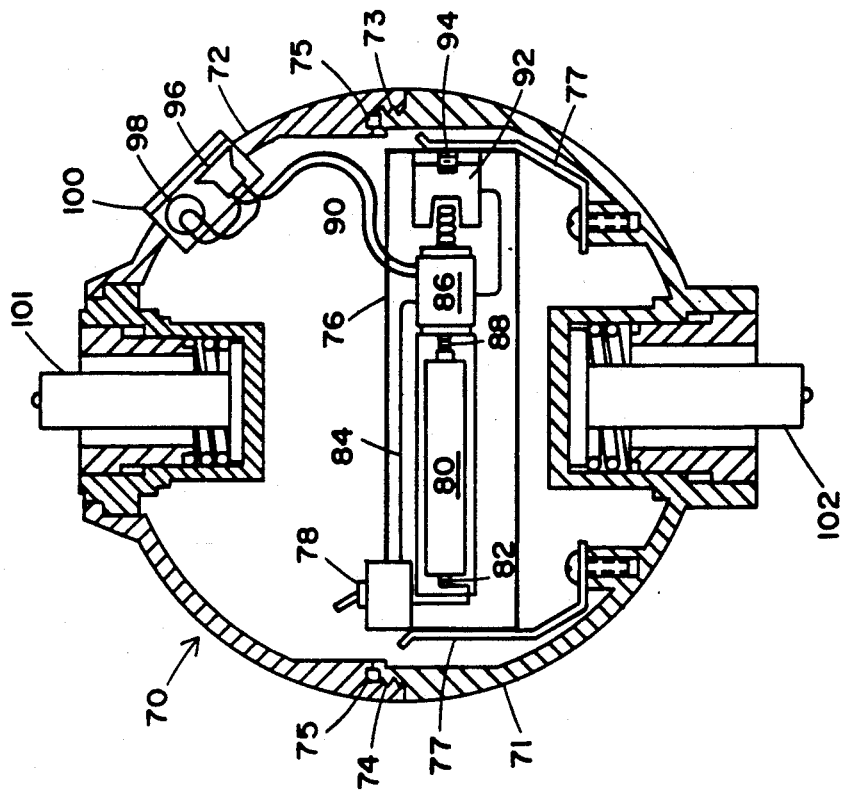
FIG. 7 is a cross sectional view of another alternate form of the fish bite detector of the present invention disposed within a fish float.

FIG. 7 shows an embodiment of the bite detector of the present invention disposed within a generally spherical fish-float or fishing bobber. The bobber illustrated generally at 70 is made of a suitable molded plastic and is made into a lower section 71 and upper section 72, (both half-spheres) that are joined through interfitting locking threads 73 and 74. A suitable seal 75, such as an O-ring seal, may be used between the two sections. Within lower section 71 is housing 76 for the bite detector of the present invention as generally disclosed with reference to FIG. 2, FIG. 3 and FIG. 4 above. Housing 76 is held in place by mounting bracket 77. Positioned at one end of housing 76 is activation switch 78 which activates the bite detector electronic circuit. Switch 78 connected to power source 80 via a first power source contact 82 at one end and a conduit 84 at the other end. Conduit 84 is connected to timer chip 86 which is interdisposed between conduit 84 and second power source contact 88. The electronic circuit further includes first electrical contact 90 and second electrical contact 92 which are movable relative to one another via sensitivity adjuster 94. Connected to the trigger circuit is audible signal means 96 and visual signal means 98 which are positioned on upper section 72. Audible signal means 96 and visual signal means 98 may be covered by a water resistant cover 100 which permits transmission of sound and light but does not permit water infiltration. Water resistant cover 100 is formed from a light and sound transmissible material, typically a plastic diaphragm which may be clear, opaque or colored. Also included on bobber 70 are spring-biased upper and lower fishing line anchors 101 and 102, respectively, for detachably securing a fishing line to the bobber. When in use, the bobber would be floating in water roughly along its midpoint with the top portion (74) positioned above the water. If a fish struck a baited hook tethered to the bobber, the sudden vibrational movement would cause the first and second electrical contacts to come into contact with each other, thus completing the circuit and activating the audible and visual alarms.

Figure 8:
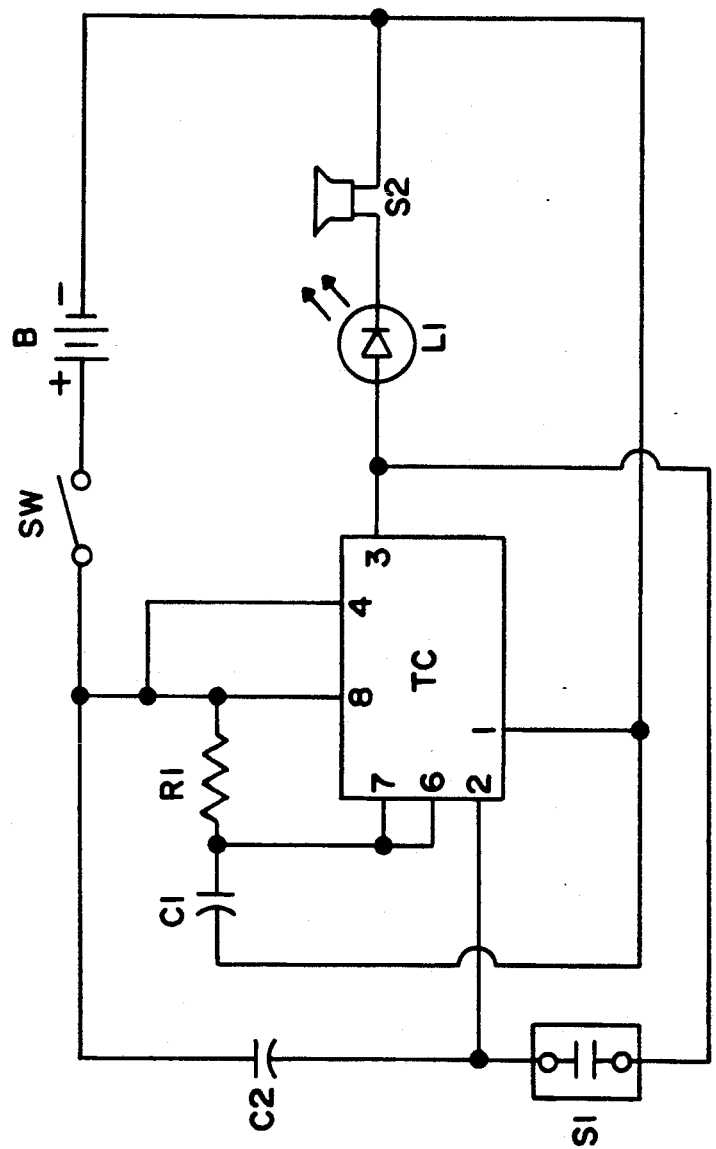
FIG. 8 schematically illustrates one form of the circuitry of the bite detector of the present invention.

FIG. 8 illustrates one form of an electronic circuit which may be used in the bite detector of the present invention. The circuit comprises integrated circuit timer chip TC connected to a power source, a sensor switch connected to the power source and audible and visual alarms connected to the power source. The electronic circuit is activated by on-off switch SW. Pin 1 of TC is connected to the negative pole of that circuit. Pin 2 is connected to pin 4 and pin 8 across capacitor C2 and is further connected to sensor means S1 of that circuit. Pin 3 is connected to the positive pole of that circuit via sensor S1 and light emitting diode L1 and sounder S2 connected in series. L1 and S2 may also be connected in parallel between pin 3 and the circuit. Pin 4 is connected to pin 8 which are connected to the positive side of the circuit. Pin 6 is connected to pin 7 and are connected to pin 8 across resistor R1 and across capacitor C1 which is in turn connected to the negative pole of the circuit. In the illustrated example the circuit has both visual and audible signalling means, although it will be appreciated that either one may be omitted or when connected in parallel, they may be made selectively operable via an additional on-off switch or switches (not shown). In other alternate embodiments R1 and C1 may be variable resistors or capacitors in order to adjust the length of the signalling sequence and resetting times approximately 3 to 15 seconds in duration. The circuitry components as shown including the timer chip are readily available and may be purchased at any number of electronic supply houses, including, for example, Radio Shack. Preferred ranges for the power source are on the order of 1.5 to 12 V. Resistor R1 is in the range of 200 to 1000 K ohms, preferably 400 to 500 K ohms. Capacitors C1 and C2 are in the range of 0.5 to 50 microfarads at 16 V and are preferably 10 microfarads at 16 V. Timer chip TC has a timing sequence of 1 to 25 seconds, preferably 3 to 10 seconds. Finally, as only one embodiment of the electronic circuit has been described, it will be understood that the circuit can be modified in a number of ways, including substitution of a second resistor of substantially similar value as R1 for capacitor C2.

The bite detector of the present invention is designed to ignore any movements that are not sudden, such as those caused by wind or water movement. This means that the detector does not monitor movements of the rod or of a bite detector bobber which have no significance to the angler. There is no activation when the rod merely bends, irrespective of the direction or the degree of bending, or in the case of the bobber with normal wave responsive movement but rather, activation only takes place when the movement of the motion sensitive means is sudden, regardless of the tip of the position of the rod when this occurs.

The foregoing description is illustrative of the preferred embodiments shown. It is not intended to limit the present invention to the specific constructions shown and described, but instead it will be appreciated that adaptations and modifications will become apparent from the present disclosure and are intended to be within the scope of the claims.

I claim:

1. A fish bite detector for use on a flexible fishing rod, said detector comprising:
    an electronic circuit enclosed in a housing consisting of an elongated, hollow, cylindrical casing for receiving at least one battery power source, said housing having a top, a bottom, opposite sides and opposite ends and at least one bracket for mounting said housing to a fishing pole;
    said electronic circuit comprising an integrated circuit timer chip connected to said power source, means for sensing vibrational movement of the fishing pole comprising a pair of electrical contacts moveable relative to each other wherein at least one member of said pair of electrical contacts is a helical spring positioned within a cavity forming the other member of said electrical contact pair, said circuit further including an alarm;
    whereupon activation of the circuit, the alarm signals and the circuit resets itself after a predetermined time.

2. A fish bite detector as set forth in claim 1 wherein said alarm comprises visual alarm means and audible alarm means.

3. A fish bite detector as set forth in claim 1 wherein said visual alarm means is selected from the group consisting of a light emitting diode or a light bulb, of approximately 0.5 watts or less.

4. A fish bite detector as set forth in claim 3 wherein said audible alarm means is a piezo-electric buzzer.

5. A fish bite detector as set forth in claim 4 further including means for selectively operating said visual alarm or said audible alarm.

6. A fish bite detector for use on a flexible fishing rod, said detector comprising:
   an electronic circuit enclosed in a housing consisting of an elongated, hollow, cylindrical casing for receiving at least one battery power source, said housing having a top, a bottom, opposite sides and opposite ends and at least one bracket for mounting said housing to a fishing pole;
   said electronic circuit comprising an integrated circuit timer chip connected to said power source, means for sensing vibrational movement of the fishing pole comprising a pair of electrical contacts moveable relative to each other wherein at least one member one member of said electrical contact pair is a helical spring and the other member of said electrical contact pair is positioned centrally and longitudinally within the interior of said spring, said circuit further including an alarm, said alarm comprising a light emitting diode and a piezoelectric buzzer;
   whereupon activation of the circuit, the alarm signals and the circuit resets itself after a predetermined time.

7. A fish bite detector as set forth in claim 6 further including a switch for selectively operating said visual alarm and said audible alarm.

8. A fish bite detector integrally disposed within a flexible fishing rod, comprising:
   a rod having a handle, a shaft and rod tip, said handle positioned at one end of the shaft and the rod tip positioned on the shaft at the other end, said detector comprising an electronic circuit enclosed in said handle, said circuit comprising an integrated circuit timer chip connected to an battery power source, means for sensing vibrational movement of the fishing rod comprising a pair of electrical contacts positioned at the tip end of said rod, said contacts being moveable relative to each other wherein at least one member of said pair of electrical contacts is a resilient helical wire spring positioned within a cavity comprising the other member of said electrical contact pair and further including an alarm means disposed within said handle,
   whereupon activation of the circuit, the alarm signals and the circuit resets itself after a predetermined time.

9. A fish bite detector as set forth in claim 6 wherein said alarm means comprises a visual alarm means selected from the group consisting of a light emitting diode or a light bulb of approximately 0.5 watts or less, and wherein said audible alarm means is a piezo-electric buzzer.

10. A fish bite detector as set forth in claim 7 further including means for selectively operating said visual alarm or said audible alarm.

11. A fish bite detector integrally disposed within a flexible fishing rod, comprising:
   a rod having a handle, a shaft and rod tip, said handle positioned at one end of the shaft and the rod tip positioned on the shaft at the other end, said detector comprising an electronic circuit enclosed in said handle, said circuit comprising an integrated circuit timer chip connected to an battery power source, means for sensing vibrational movement of the fishing rod comprising a pair of electrical contacts positioned at the tip end of said rod, said contacts being moveable relative to each other and wherein one member of said electrical contact pair is a helical spring and the other member of said electrical contact pair contact pair is positioned centrally and longitudinally within the interior of said spring, said circuit further including an alarm means disposed within said handle,
   whereupon activation of the circuit, the alarm signals and the circuit resets itself after a predetermined time.

12. A fish bite detector as set forth in claim 11 wherein said alarm means comprises a visual alarm means selected from the group consisting of a light emitting diode or a light bulb of approximately 0.5 watts or less, and wherein said audible alarm means is a piezo-electric buzzer.

13. A fish bite detector as set forth in claim 12 further including means for selectively operating said visual alarm or said audible alarm.

14. A fish bite detector disposed within a fishing bobber, said bobber having a generally hollow interior and a generally spherical shape, said detector comprising an electronic circuit enclosed within said bobber, said circuit comprising an integrated circuit timer chip, a battery power source, means for sensing vibrational movement of the bobber comprising a pair of electrical contacts positioned within said bobber, said contacts being adjustable and moveable relative to each other and further wherein at least one member of electrical contact pair is a resilient helical wire spring positioned within a cavity forming the other member of said electrical contact pair and further including an alarm means disposed within said bobber,
   whereupon activation of the circuit, the alarm signals and the circuit resets itself after a predetermined time.

15. A fish bite detector as set forth in claim 14 wherein said alarm means comprises a visual alarm means selected from the group consisting of a light emitting diode or a light bulb of approximately 0.5 watts or less, and wherein said audible alarm means is a piezo-electric buzzer.

16. A fish bite detector disposed within a fishing bobber, said bobber having a generally hollow interior and a generally spherical shape, said detector comprising an electronic circuit enclosed within said bobber, said circuit comprising an integrated circuit timer chip, a battery power source, means for sensing vibrational movement of the bobber comprising a pair of electrical contacts positioned within said bobber, said contacts being adjustable and moveable relative to each other and further wherein at least one member of electrical contact pair is a helical spring and the other member of said electrical contact pair is positioned centrally and longitudinally within the interior of said spring and further including an alarm means comprised of a light emitting diode an a piezo-electric buzzer disposed within said bobber,
   whereupon activation of the circuit, the alarm signals and the circuit resets itself after a predetermined time.

* * * * *